US012767335B2

(12) United States Patent
Warren et al.

(10) Patent No.: US 12,767,335 B2
(45) Date of Patent: Oct. 20, 2026

(54) POWERED LEG REST ASSEMBLY

(71) Applicant: Textron Aviation Inc., Wichita, KS (US)

(72) Inventors: Paul Stokholm Warren, Valley Center, KS (US); Joshua Lawrence Bell, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 305 days.

(21) Appl. No.: 18/538,693

(22) Filed: Dec. 13, 2023

(65) Prior Publication Data

US 2025/0197010 A1 Jun. 19, 2025

(51) Int. Cl.
*B64D 11/06* (2006.01)

(52) U.S. Cl.
CPC ................................ *B64D 11/0643* (2014.12)

(58) Field of Classification Search
CPC .................................................. B64D 11/0643
See application file for complete search history.

(56) References Cited

U.S. PATENT DOCUMENTS 4,819,987 A 4/1989 Stringer
5,352,020 A 10/1994 Wade et al.
6,695,406 B2 2/2004 Plant
8,398,168 B2 3/2013 Lawson
8,444,225 B2 5/2013 Behe
8,444,226 B2 5/2013 Driessen et al.
9,326,608 B1 5/2016 Hoy et al.
9,422,058 B2 8/2016 Fischer et al.
9,481,466 B2 11/2016 Fischer et al.
11,565,819 B2 1/2023 Mayne et al.
2014/0292052 A1 10/2014 Parker et al.
2016/0000227 A1* 1/2016 Kim .................. B64D 11/0643
297/423.26

FOREIGN PATENT DOCUMENTS

CN 117017000 A * 11/2023 ......... B64D 11/0643
EP 3385165 A1 * 10/2018 ......... B64D 11/0643
GB 2533660 A * 6/2016 ......... B64D 11/0643
WO WO-2024013527 A1 * 1/2024 ......... B64D 11/0643

* cited by examiner

*Primary Examiner* — Anthony D Barfield
(74) *Attorney, Agent, or Firm* — Avek IP, LLC

(57) ABSTRACT

The invention discloses a powered leg rest assembly for aircraft, featuring a motor-driven gear train rotating an output shaft connected to a leg rest extension mechanism and leg rest cushion. Monitored by a hollow shaft single-turn absolute encoder and backed by limit switches, the leg rest's position is precisely regulated during deployment. A motion control system ensures clearance from seat cushion thigh support, extending the leg rest away from the seat cushion. A power-on brake, activated at the commanded position, securely holds the leg rest. The assembly is designed for manual stowing in case of power loss or system fault. Incorporating back drivability, ergonomic extension, and real-time feedback, this innovation provides enhanced comfort and adaptability for aircraft occupants.

20 Claims, 8 Drawing Sheets

POWERED LEG REST ASSEMBLY

BACKGROUND OF THE INVENTION

1. Field

The disclosed embodiments relate generally to the field of passenger seating in aircraft. More specifically, the disclosed embodiments relate to providing moveable leg rest assemblies that can be moved using powered motors and do not require manual manipulation by the seated occupant.

2. Description of the Related Art

Existing seat leg rest assemblies for aircraft may be heavy or difficult to stow due to excessive spring forces needed to deploy the leg rest assemblies. Additionally, many existing seat leg rest assemblies are unable to reach a horizontal position. U.S. Pat. No. 8,444,225 to Behe discloses a leg rest assembly with a lockable gas spring cylinder and a foot support that telescopically extends from a calf support. U.S. Pat. No. 8,444,226 to Driessen et al. discloses a leg rest assembly with a gas spring. U.S. Pat. No. 6,695,406 to Plant discloses a reclinable passenger seat with a leg rest extension diaphragm that telescopes to lengthen or shorten the overall length of the leg rest assembly. U.S. Pat. No. 5,352,020 to Wade et al. discloses two hydraulic locking cylinders for extending and retracting the leg rest assembly, respectively. U.S. Pat. No. 4,819,987 to Stringer discloses a leg rest assembly that is extended by an actuation assembly that includes a hydraulic actuator of the piston/cylinder type. U.S. Application 2014/0292052 to Parker et al. discloses a reclining lounger chair that includes a gas spring connected to a set of linkages to extend a seat leg rest assembly.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

The powered leg rest assembly for aircraft represents a significant advancement in passenger comfort and convenience during air travel. At its core, the system is driven by a motor-powered gear train, transmitting motion to an output shaft intricately connected to a leg rest extension mechanism and leg rest cushion. This innovative design allows for a seamless transition from a stowed position to a deployed position, enhancing the overall in-flight experience. Furthermore, the leg rest assembly may be commanded to stop at any intermediate position by the seated occupant.

The precise control of the leg rest's position is a key feature of this invention. Monitored by a hollow shaft single-turn absolute encoder, the leg rest's movement is closely tracked in relation to deployed and stowed travel limits. Complemented by backup limit switches, this monitoring system not only ensures accurate positioning but also adds a layer of safety to the deployment process. The data reported by the encoder is instrumental in regulating the speed of the leg rest deployment, contributing to a smooth and controlled motion. Data collected by the encoder also allows for positions to be held in memory to allow the leg rest assembly to return to a previous position.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
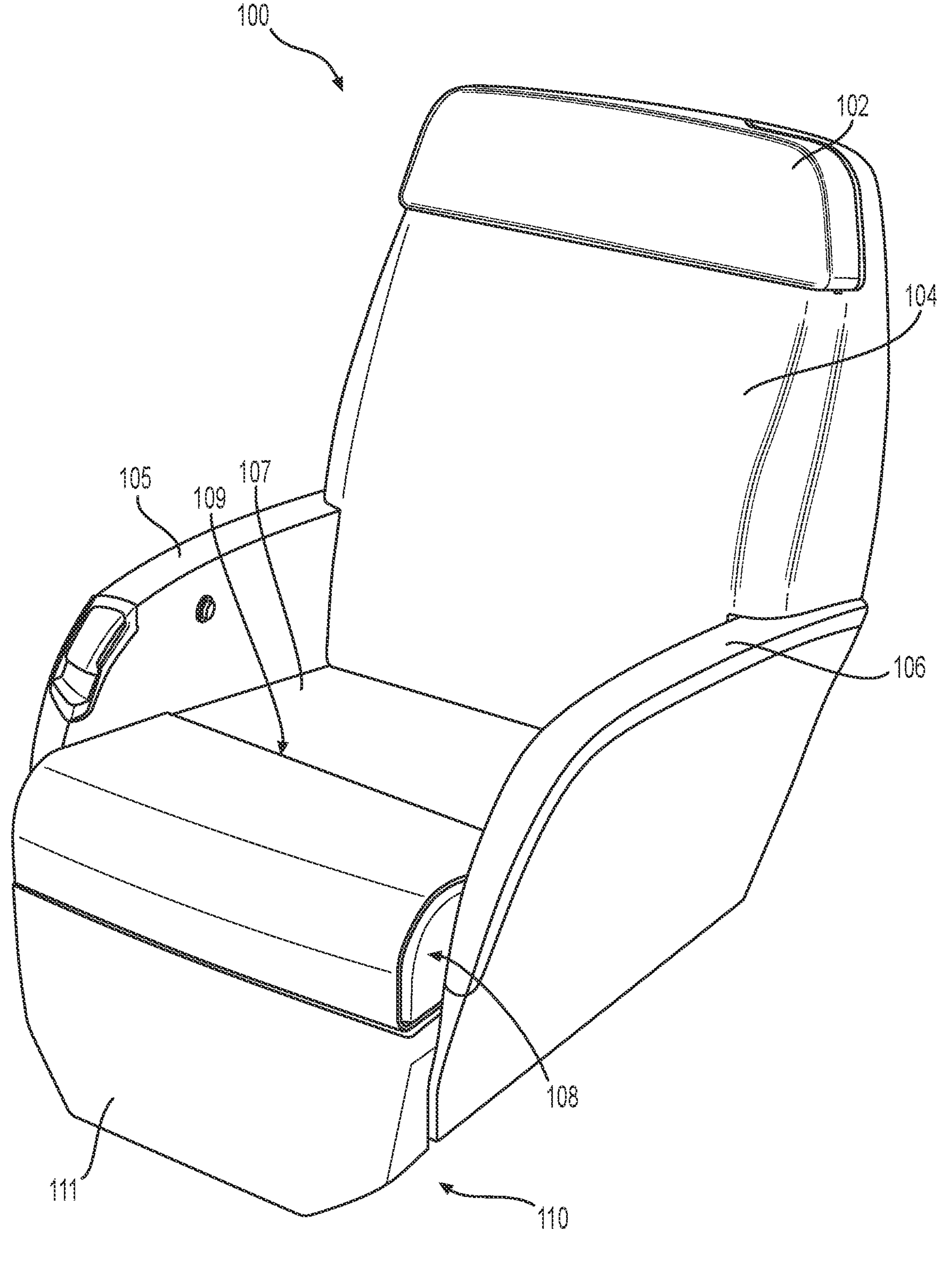
FIG. 1 is a perspective view showing a seat with a powered leg rest assembly in a stowed position, according to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

Figure 2:
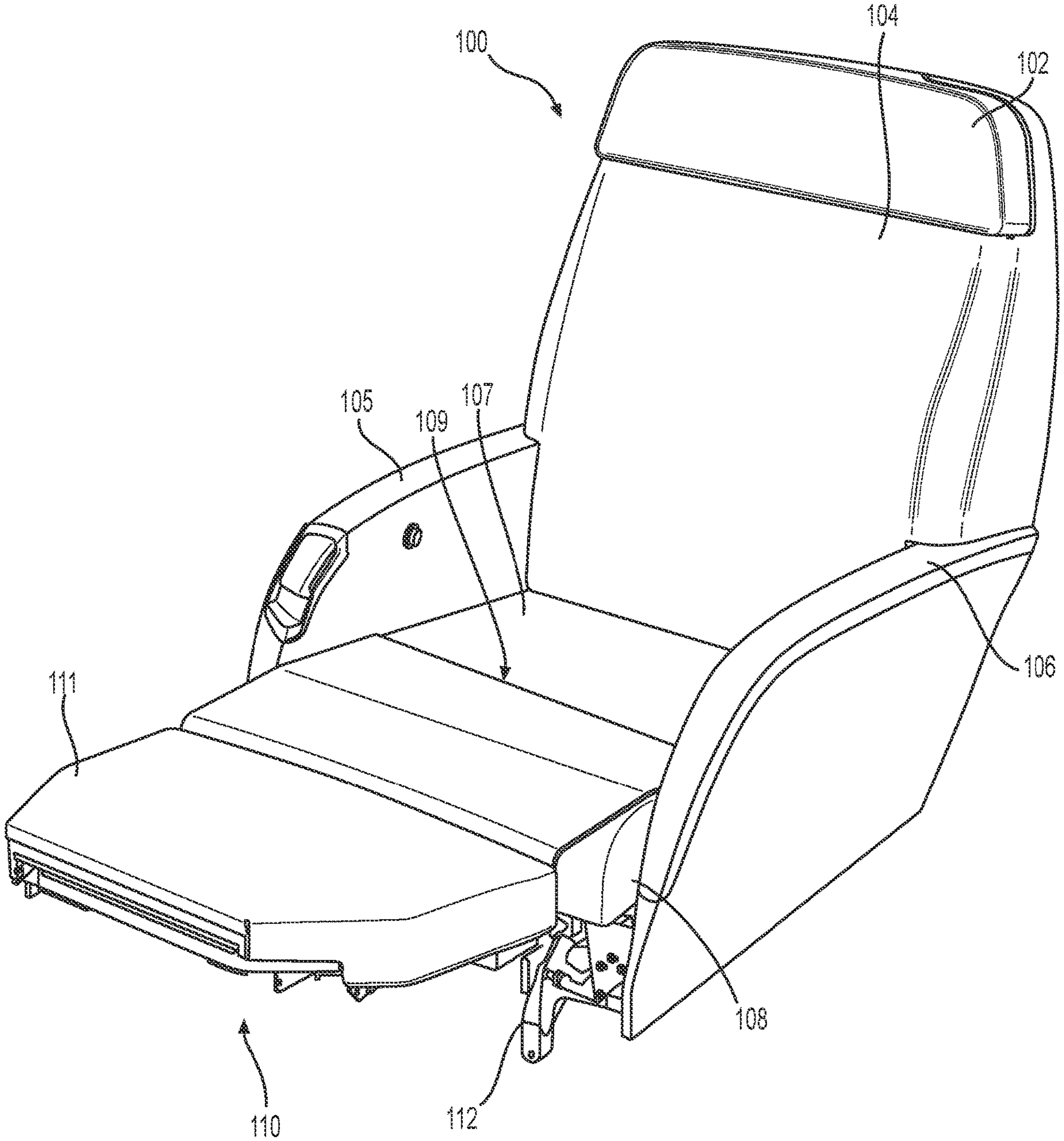
FIG. 2 is a perspective view showing the seat with a powered leg rest assembly in a deployed position, according to some embodiments.

FIG. 1 is a perspective view showing a seat 100 with an exemplary leg rest assembly 110 in a stowed position. FIG. 2 is a perspective view showing seat 100 with leg rest assembly 110 in a fully deployed position. FIGS. 1 and 2 are best viewed together with the following description. Seat 100 includes a headrest 102, a back 104, a right armrest 105, a left armrest 106, and a bottom cushion 107, which are adapted for supporting a seated occupant. Leg rest assembly 110 includes a leg rest cushion 111. In certain embodiments, leg rest cushion 111 is removable, as further described below in connection with FIG. 6.

Bottom cushion 107 includes a frontside 108 that comprises the forward-facing portion of the cushion. In certain embodiments, frontside 108 has a particular shape that is adapted for assisting with stowing of leg rest assembly 110. For example, the frontside 108 may include a rounded portion, and the rounded portion may be shaped with a particular size and a particular curvature adapted to provide a predetermined outer length that matches a length of flexible member 120 when leg rest assembly 110 is stowed.

Leg rest assembly 110 is slidable upon a pair of carriages (not shown) that extend from a pair of supports (not shown). Specifically, a first carriage extends from a first support and a second carriage extends from a second support. A first extending member (not shown) and second extending member (not shown) are adapted for extending during deployment of leg rest assembly 110.

Returning to FIG. 2, leg rest assembly 110 is fully deployed in front of seat 100 to a substantially horizontal orientation. In the present disclosure, substantially horizontal should be construed to mean substantially parallel with the floor upon which seat 100 rests. Available positions of leg rest assembly 110 include fully deployed (as depicted in FIG. 2), stowed (as depicted in FIG. 1), or partially deployed (not shown). Partially deployed positions may include one or more positions in which leg rest assembly 110 is angled between the fully stowed and fully deployed positions. Fully and partially deployed positions may be used by a seated occupant for reclining in seat 100. The fully deployed position also enables the user to lie down when seat back 104 is lowered to a substantially horizontal position. A base 112 is adapted for mounting seat 100 to an aircraft cabin floor and may include a swiveling capability (not shown) for rotating the orientation of seat 100 and a forward/aft and side-to-side translating abilities (not shown).

Figure 3:
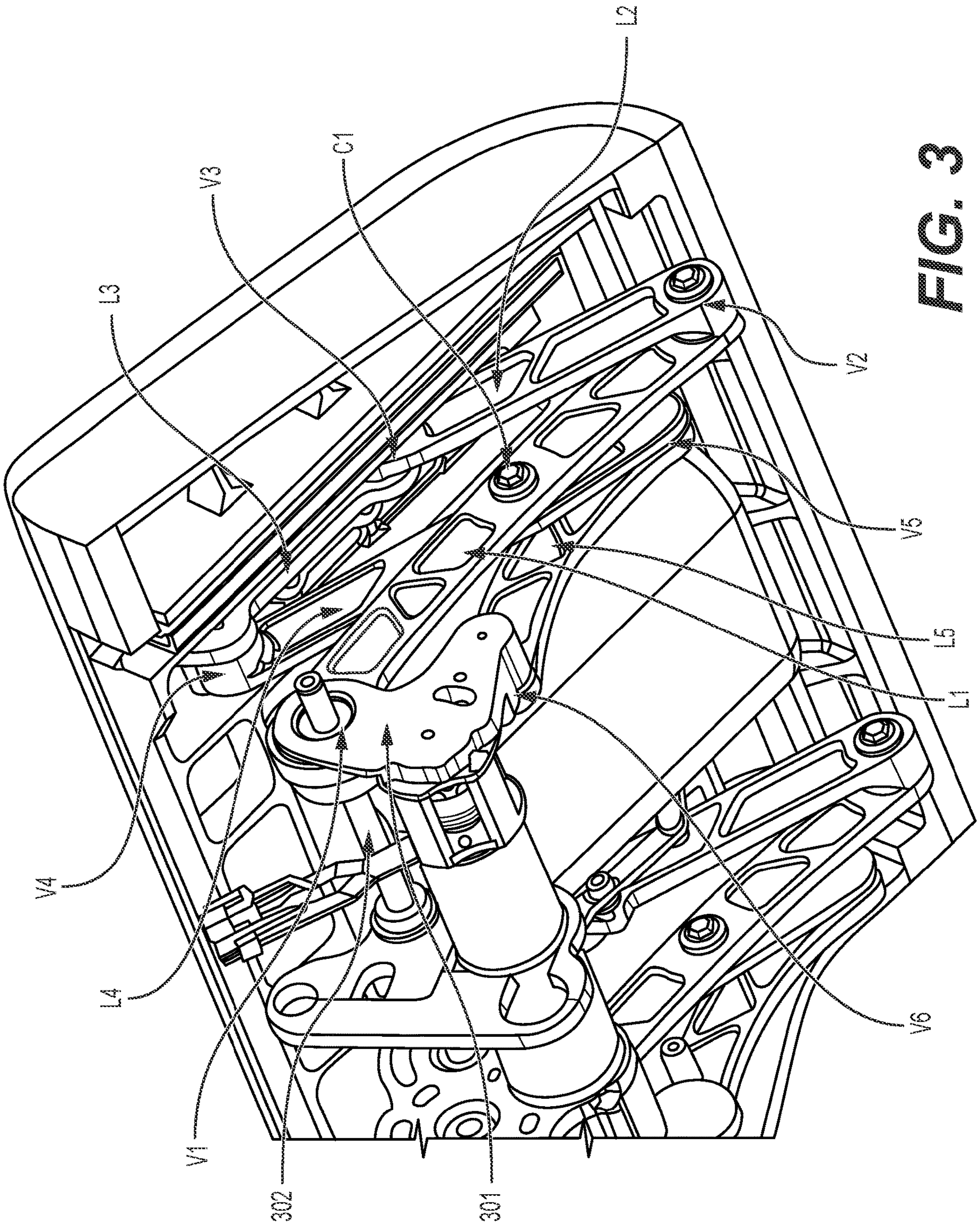
FIG. 3 is a perspective view showing some details of a powered leg rest assembly, according to some embodiments.
Figure 4:
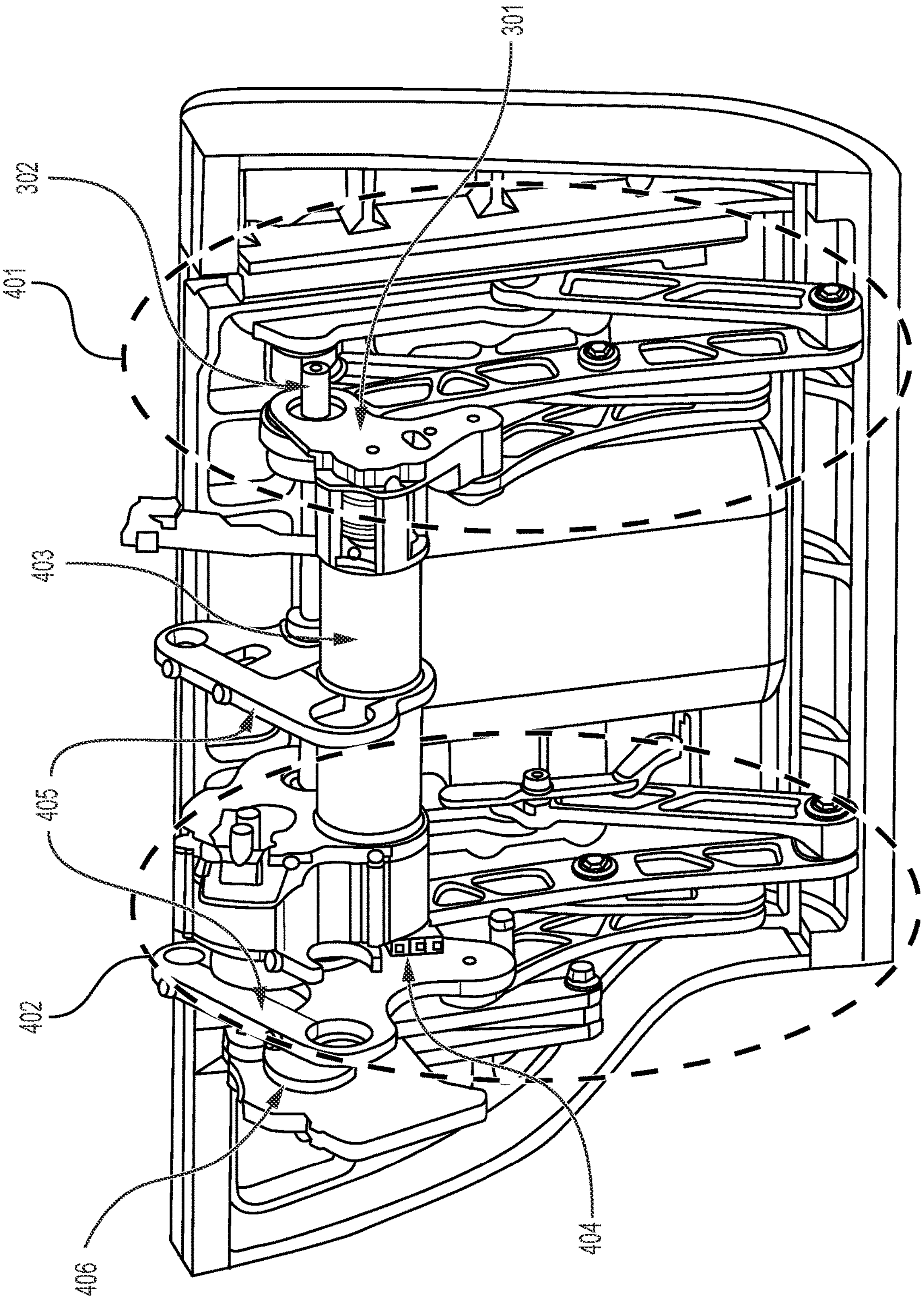
FIG. 4 is a perspective view showing some details of a powered leg rest assembly, according to some embodiments.
Figure 5:
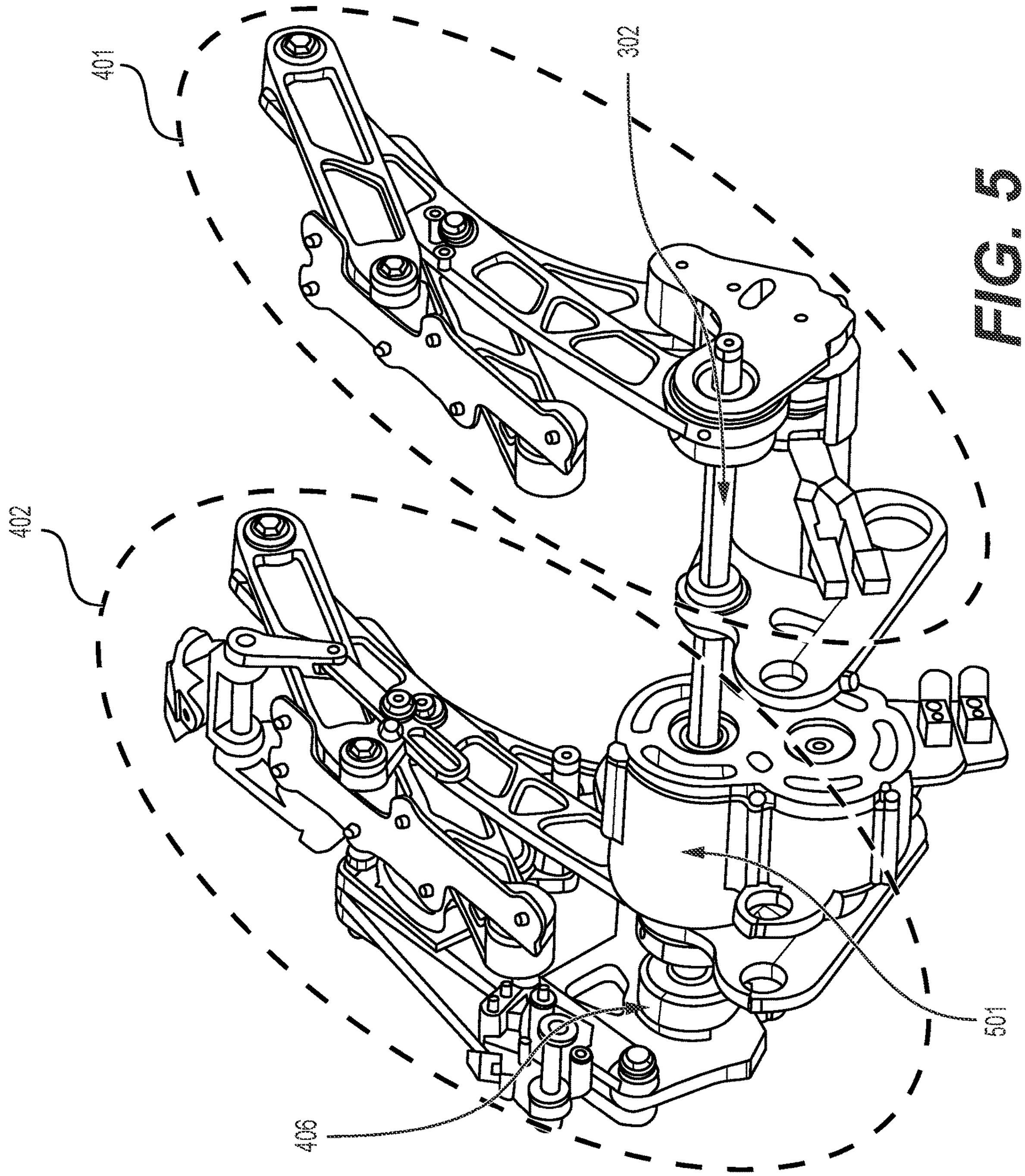
FIG. 5 is a perspective view showing some details of a powered leg rest assembly, according to some embodiments.

FIG. 3 is a perspective view showing some details of a powered leg rest assembly, according to some embodiments. The powered leg rest assembly is shown in a substantially stowed position. FIG. 4 is a perspective view showing some details of a powered leg rest assembly, according to some embodiments. FIG. 5 is a perspective view showing some details of a powered leg rest assembly, according to some embodiments. FIGS. 3-5 are best viewed together with the following description.

The powered leg rest assembly comprises a leg rest extension mechanism. The extension mechanism comprises five links and six vertices among many other components. Link-1, L1, has a proximal end that is connected to a first vertex, V1. First vertex, V1, is located on a plate 301 with a generally triangular shape. V1 is nominally located at one of the vertices of the triangle. A distal end of Link-1 connects to a proximal end of Link-2, L2 at a second vertex, V2. A distal end of Link-2 connects to a proximal end of Link-3, L3 at a third vertex, V3. Link-3 is fastened to the underside of the leg rest cushion. A distal end of Link-3 connects to a proximal end of Link-4, L4 at a fourth vertex, V4. A distal end of Link-4 connects to a proximal end of Link-5, L5 at a fifth vertex, V5. A distal end of Link-5 connects to the plate 301 at a second vertex of the triangle. Link-2 and Link-5 are further connected near their respective centers at Coupling-1, C1.

The leg rest assembly comprises two parallel leg rest extension mechanisms as illustrated in FIG. 4 and FIG. 5. The assemblies of links and vertices are generally contained within the two ellipses 401 and 402. A motor 403 drives a gear train 501 to provide rotary motion. The gear train connects to an output shaft 302 which in turn connects to the plate 301 at vertex V1. As the output shaft 302 rotates (e.g. counter-clockwise in FIG. 3), Link-1 moves away from the triangular plate 301 and causes the remaining links to move and extend. This movement causes the leg rest cushion to move from a stowed position to a deployed position. Kinematically, this is equivalent to a 5-bar mechanism (e.g. V1, C1, V5, V6, center of plate 301) coupled to a 4-bar mechanism (e.g. C1, V2, V3, V4). This provides multiple degrees of freedom and allows the leg rest assembly to rotate from a nominally vertical position (e.g. in the stowed position) to a nominally horizontal position (e.g. in the fully deployed position).

Gear train 501 is mechanically coupled with motor 403 for providing a desired torque output and speed of rotation to output shaft 302. Gear train 501 may be independently mounted to support members 405 to prevent the gear train from rotating. Support members 405 attach the leg rest assembly to the seat. In some embodiments, motor 403 includes a motor driver which activates the motor. The motor driver accurately controls the speed and start/stop of motor 403.

The motor 403 does not need to provide sustained motion or rapid motion because only fractional rotation of output shaft 302 is needed to extend the leg rest assemblies (e.g., output shaft 302 rotates less than one full rotation between stowed and deployed positions). The motor will operate continuously at a high rpm while the leg rest is actively being deployed or stowed. Otherwise, the motor is inactive. However, motor 403 is configured to accurately rotate output shaft 302 to the commanded position without overheating. For example, motor 403 may be a direct-current (DC) electric motor, a stepper motor, or a servo motor. The motor preferably operates quickly and quietly and is small enough in physical size to fit within the leg rest assembly. Additionally, motor 403 and gear train 501 are rigidly fixed to output shaft 302 without the use of a clutch or solenoid or any other mechanism that would enable detachment between output shaft 302 and motor 403 under normal operation. In other words, output shaft 302 is continually connected to motor 403 and gear train 501 may not be disconnected during planned use of the leg rest assembly. In some embodiments, motor 403 may be operated in reverse to move the leg rest assembly from the deployed to the stowed position.

A hollow shaft single turn absolute encoder 406 ensures that the position of the leg rest assembly is accurately known. Data reported in real time by the encoder may be used to control and regulate the speed and position of the leg rest assembly during deployment. The motor further comprises a power-on braking mechanism to hold the leg rest assembly at a specific orientation as selected by the seated occupant. The motor is engaged only when actively receiving input from the seated occupant. When the motor is not active, (i.e. not receiving any input signals) the power-on brake is engaged and holds the leg rest assembly at the requested position. When the motor is engaged, the power-on brake turns off. Limit switches 404 are employed as a backup limit stop ensuring that the leg rest assembly is not deployed past its designed limit.

A motion control system is employed to take input from the seated occupant, receive data from the encoder, receive signals from the limit switches, and provide control signals to the motor. The motion control system may operate in response to input from the seated occupant through a control interface. The control interface may include any one or more of switches, buttons, rotary knobs, sliders, a touch screen, a personal digital assistant (PDA), a smart phone application, voice commands, and the like. Data from the encoder may be stored in memory to allow the leg rest assembly to be returned to a previous position. This allows the leg rest assembly position to be set as a personal preference by the seated occupant for future flights. The motion control system may also be addressed by central control systems under the control of personnel such as pilots and flight attendants in case of an emergency. As an example, this would allow the pilots and/or flight attendants to command all of the leg rests on the aircraft to return to the stowed position without requiring the seated occupants to respond. The motion control system may also report the position of the leg rest assembly to the central control system. This allows for faster checks during taxi, take-off, and landing (TTOL) operations by the cabin crew.

The motion control system may be preprogrammed to allow deployment of the leg rest assembly into seats of different sizes and styles to be mounted in different types of aircraft. The preprogramming may include parameters such as maximum deployment speed, maximum deployment travel, control interface language, etc.

When the leg rest assembly is deployed and no further input is received from the seated occupant through the control interface, a power on brake is engaged to hold the leg rest assembly at the requested position. The power on brake ensures that the leg rest assembly remains at the desired position. The seated occupant is free to make adjustments to the leg rest position at any time during flight except during TTOL operations as required by regulations.

The gear train 501 is designed to be back drivable. This allows the leg rest assembly to be manually moved to a stowed position if power to the motor and/or motion control system is lost or if a system fault occurs. The power on brake is also overcome by this manual action since there is no power provided to the brake. In this way, the leg rest assembly meets the required safety requirements.

When the leg rest assembly is in the stowed position, safety features ensure that the leg rest assembly cannot move. One example of the safety features is the power-on brake. In the fully stowed position, the motor is not active and the power-on brake holds the leg rest assembly in the stowed position. This is especially important during critical phases of operation such as TTOL operations.

Figure 6:
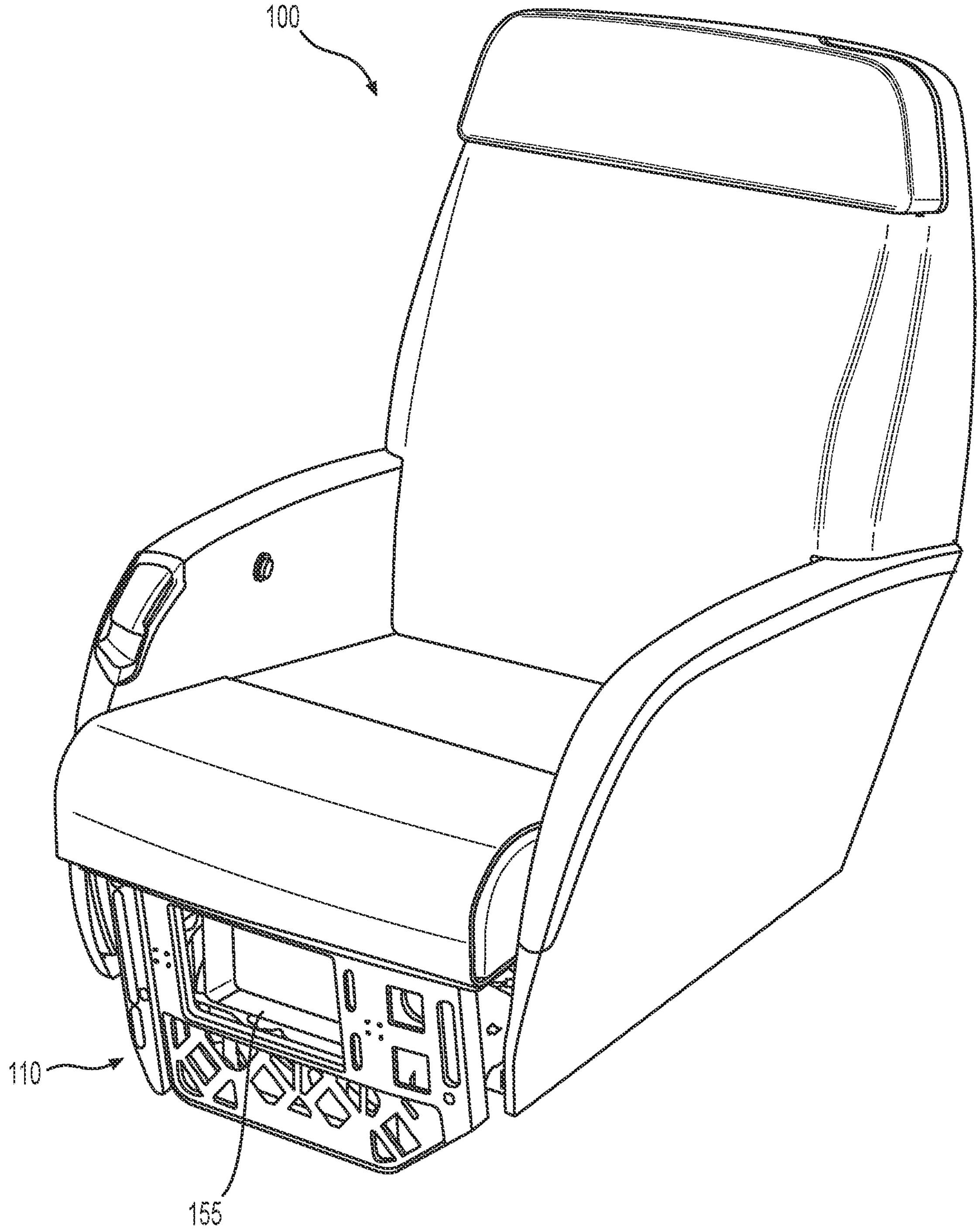
FIG. 6 is a perspective view showing a seat with a powered leg rest assembly in a stowed position, according to some embodiments.

FIG. 6 is a perspective view showing seat 100 with leg rest assembly 110 in the stowed position and leg rest cushion 111 removed to enable viewing of internal components. Specifically, life vest box 155 is accessible through a window in the leg rest assembly structure for accessing a life vest in case of emergency. Leg rest cushion 111 is secured to the underlying structure via a plurality of tabs. The tabs are adapted to release leg rest cushion 111 when the user pries it away using a moderate amount of force.

Leg rest assembly 110 is slidable along first and second carriages (not shown). The carriages provide tracks having rollers, wheels, bearings, and/or plain bearings that enable a low-friction sliding movement of the leg rest for extending and retracting. A cable reel may be used to automatically extend leg rest assembly 110 along the carriages as the leg rest assembly is deployed, as further described below in connection with FIG. 7.

Figure 7:
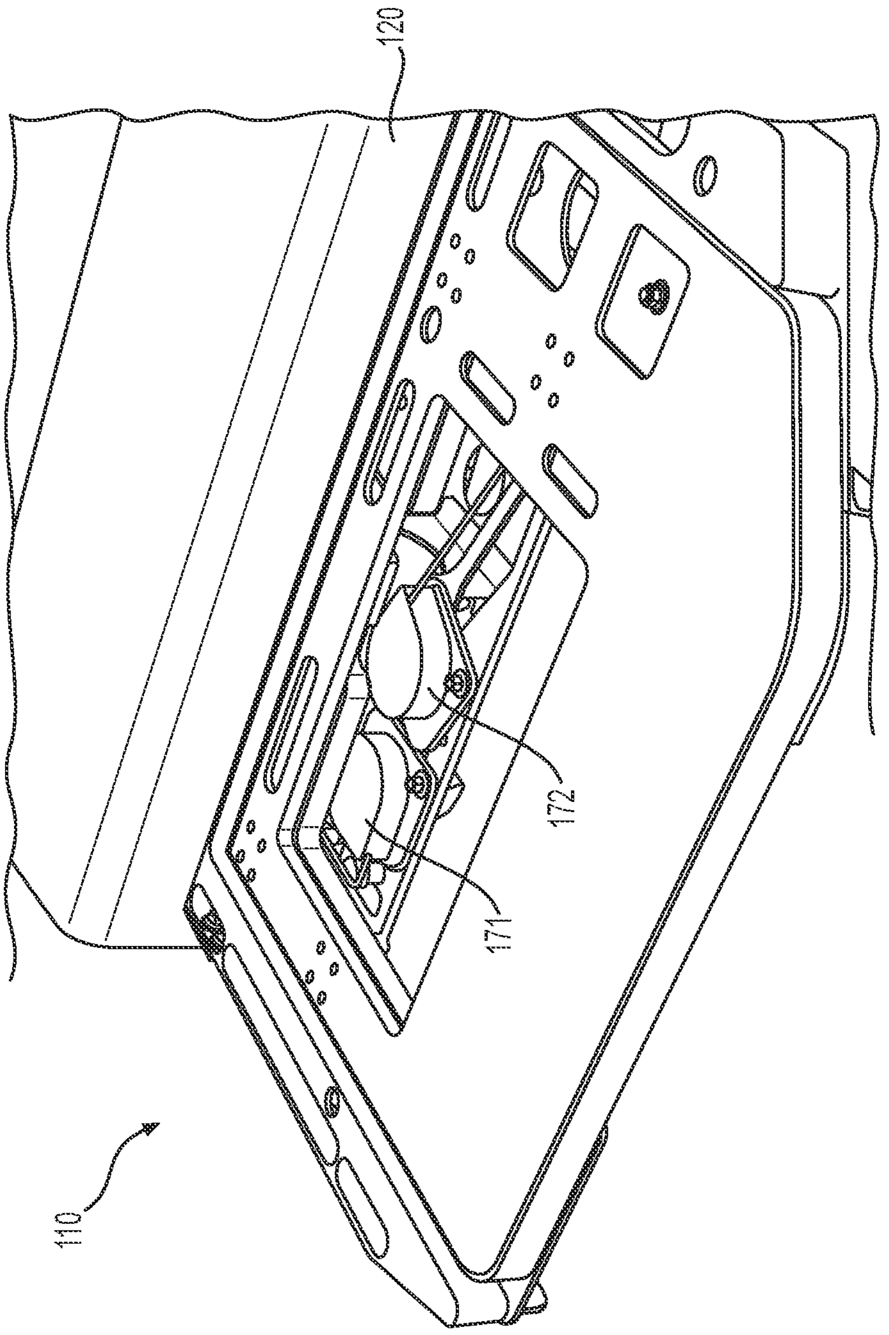
FIG. 7 is a perspective view showing a seat with a powered leg rest assembly in a deployed position, according to some embodiments.

FIG. 7 is a perspective view showing leg rest assembly 110 with the leg rest cushion removed for viewing internal components. Specifically, a first cable reel 171 and a second cable reel 172 are visible. First and second cable reels 171, 172 are for example spring-loaded reels that automatically retract their respective cables. When leg rest assembly 110 is deployed, first and second cable reels 171, 172 pull their respective cables, which are routed via pulleys such that the leg rest assembly automatically extends along first and second carriages to effectively lengthen the leg rest. When leg rest assembly 110 is stowed, flexible member 120 causes the leg rest assembly to retract along carriages, and the cables are pulled out of cable reels 171, 172. In other words, the force of the stowing leg rest assembly overcomes the spring force of the reels.

Figure 8:
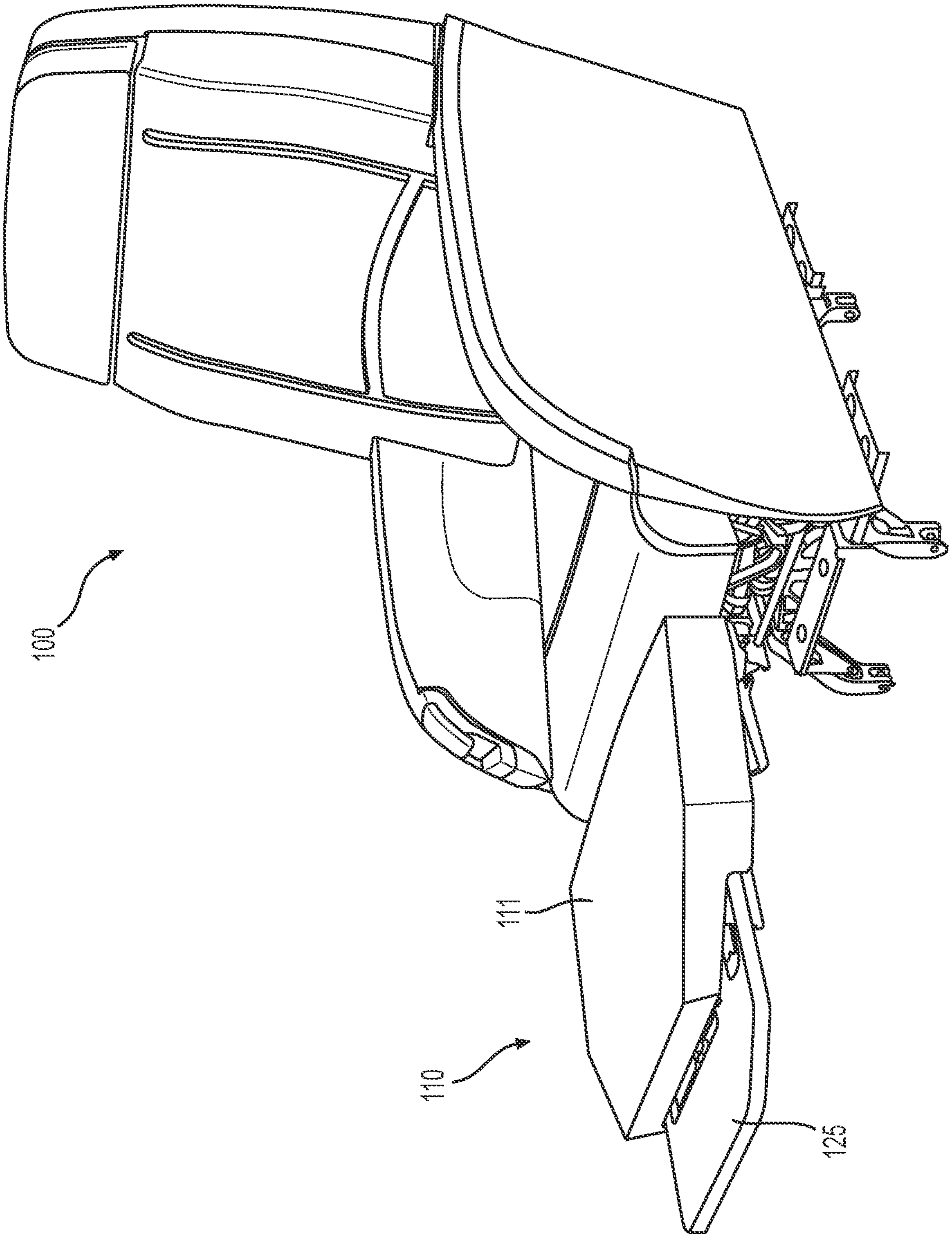
FIG. 8 is a perspective view showing a seat with a powered leg rest assembly in a deployed position, according to some embodiments.

FIG. 8 is a perspective view showing leg rest assembly 110 with the leg rest assembly deployed and an optional leg rest extension 125 in an extended position. Leg rest extension 125 may be manually slid to the extended position via a pair of sliding carriages on a respective pair of stationary rails housed within leg rest 110 (not shown). Alternatively, leg rest extension 125 may be automatically slid to the extended position via a pair of sliding carriages on a respective pair of stationary rails housed within leg rest 110 (not shown) in response to input by the seated occupant through the control interface. A latch is used to secure leg rest extension 125 within leg rest assembly 110. In certain embodiments, the leg rest extension is manually pulled to release the latch so that extension 125 may be extended to accommodate taller occupants. In some embodiments, the leg rest assembly is moved inwardly to release the latch so that extension 125 may be manually pulled to the extended position. Prior to stowing leg rest assembly 110, leg rest extension 125 is moved inwardly until the latch is reengaged.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A powered leg rest assembly for an aircraft, the powered leg rest assembly comprising:

a motor, a gear train driven by the motor, an output shaft connected to the gear train, a leg rest extension mechanism pivotally coupled to the output shaft, wherein the leg rest extension mechanism comprises a 5-bar mechanism coupled to a 4-bar mechanism, a leg rest cushion attached to the leg rest extension mechanism, wherein the motor is configured to rotate the output shaft, causing the leg rest extension mechanism to expand and move the leg rest cushion from a stowed position to a deployed position.

2. The powered leg rest assembly of claim 1, further comprising a hollow shaft single turn absolute encoder operable to monitor the position of the leg rest assembly in relation to stowed and deployed travel limits.

3. The powered leg rest assembly of claim 2, wherein data reported by the encoder is utilized to control and regulate the speed of the leg rest deployment.

4. The powered leg rest assembly of claim 2, wherein limit switches provide a backup limit stop for the leg rest assembly.

5. The powered leg rest assembly of claim 2, further comprising a motion control system used to control the operation of the motor.

6. The powered leg rest assembly of claim 5, further comprising a control interface allowing a seated occupant to adjust the leg rest assembly position.

7. The powered leg rest assembly of claim 6, further comprising a power-on brake mechanism activated when no further input is received from the seated occupant through the control interface.

8. The powered leg rest assembly of claim 7, wherein the power-on brake allows manual stowing of the leg rest if power is lost or a system fault occurs.

9. The powered leg rest assembly of claim 8, wherein the power-on brake prevents unintended leg rest movement during taxi, takeoff, and landing.

10. The powered leg rest assembly of claim 5, wherein the encoder provides real-time position feedback to the motion control system.

11. The powered leg rest assembly of claim 5, wherein the motion control system is programmable to adapt to different seat configurations.

12. The powered leg rest assembly of claim 1, wherein the leg rest extension mechanism is designed to allow back drivability enabling manual stowing of the leg rest in the event of power loss or system fault.

13. The powered leg rest assembly of claim 1, wherein the gear train is configured to be back drivable for manual operation.

14. The powered leg rest assembly of claim 1, wherein the motor is a direct current electric motor.

15. The powered leg rest assembly of claim 14, wherein the direct current electric motor is a stepper motor or a servo motor.

16. A powered leg rest assembly for an aircraft, the powered leg rest assembly comprising:

a motor, a gear train driven by the motor, an output shaft connected to the gear train, wherein the motor is configured to rotate the output shaft, two parallel leg rest extension mechanisms pivotally coupled to the output shaft, wherein each of the two parallel leg rest extension mechanisms comprises a 5-bar mechanism coupled to a 4-bar mechanism.

17. The powered leg rest assembly of claim 16, further comprising a hollow shaft single turn absolute encoder operable to monitor the position of the leg rest assembly in relation to stowed and deployed travel limits.

18. The powered leg rest assembly of claim 17, further comprising a motion control system used to control the operation of the motor.

19. The powered leg rest assembly of claim 18, further comprising a control interface allowing a seated occupant to adjust the leg rest assembly position.

20. The powered leg rest assembly of claim 19, further comprising a power-on brake mechanism activated when no further input is received from the seated occupant through the control interface.

* * * * *